United States Patent
Nakazawa et al.

(10) Patent No.: US 12,051,182 B2
(45) Date of Patent: Jul. 30, 2024

(54) INFORMATION PROCESSING APPARATUS AND INFORMATION PROCESSING METHOD

(71) Applicant: RAKUTEN GROUP, INC., Tokyo (JP)

(72) Inventors: Mitsuru Nakazawa, Tokyo (JP); Muhammad Aqmar, Tokyo (JP); Takashi Tomooka, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 432 days.

(21) Appl. No.: 17/356,554

(22) Filed: Jun. 24, 2021

(65) Prior Publication Data
US 2022/0138926 A1 May 5, 2022

(30) Foreign Application Priority Data
Oct. 29, 2020 (JP) ................................. 2020-181777

(51) Int. Cl.
*G06T 7/00* (2017.01)

(52) U.S. Cl.
CPC .. *G06T 7/0002* (2013.01); *G06T 2207/20076* (2013.01); *G06T 2207/20081* (2013.01); *G06T 2207/30168* (2013.01)

(58) Field of Classification Search
CPC . G06T 2207/20076; G06T 2207/20081; G06T 2207/20084; G06T 2207/30168; G06T 7/0002; G06T 7/0004
See application file for complete search history.

(56) References Cited

U.S. PATENT DOCUMENTS

| 9,721,292 B2* | 8/2017 | Agarwal | G06Q 30/08 |
| 2020/0034903 A1 | 1/2020 | Yamamoto et al. | |

FOREIGN PATENT DOCUMENTS

| CN | 103279871 B | 1/2016 |
| CN | 109559304 A | 4/2019 |
| JP | 2009-176174 A | 8/2009 |
| JP | 2014-115912 A | 6/2014 |
| JP | 2019-091323 A | 6/2019 |
| JP | 2020-017067 A | 1/2020 |
| JP | 2020-017068 A | 1/2020 |

OTHER PUBLICATIONS

A machine translated English version of document CN 109559304. (Year: 2019).*
A machine translated English version of document CN103279871. (Year: 2013).*
A machine translated English version of document CN1109559304. (Year: 2019).*

(Continued)

*Primary Examiner* — Ruiping Li
(74) *Attorney, Agent, or Firm* — HEA LAW PLLC (57) ABSTRACT

An information processing apparatus acquires a plurality of images related to a specified article, decides suitability of each of the plurality of images for estimating a state of the article, and outputs state information indicating an estimated state of the specified article based on a result of the decision and at least a part of the plurality of images.

9 Claims, 7 Drawing Sheets

(56) References Cited

OTHER PUBLICATIONS

Office Action of Jun. 29, 2022, for corresponding TW Patent Application No. 110123302 with partial English translation pp. 1-12.
Pop-Kun, [Self-initiated user test] A self-initiated analysis of the issues with the flea market application "Rakuma", Pop Insight [Online], Apr. 6, 2018, [retrieved on Nov. 29, 2021], pp. 1-13, Internet: <URL: https://popinsight.jp/blog/?p=5791> (See partial English translation of the Office Action and specifically "subject 1").
Hiroyuki Umeda, AI Basics Every Engineer Needs to Know, First edition, Impress Corporation, Toru Ogawa, Jan. 21, 2019, pp. 66-78 (document showing well-known technique) (See partial English translation of the Office Action and specifically "subject 2"/"cited document 2").
Office Action of Dec. 7, 2021, for corresponding JP Patent Application No. 2020-181777 with partial English translation pp. 1-3.
Office Action of Feb. 15, 2022, for corresponding JP Patent Application No. 2020-181777 with partial English translation, pp. 1-2 (Supplemental concise explanation of relevance for document 1 and 2 submitted in IDS dated Feb. 9, 2022).

* cited by examiner

| No | GROUP OF DOMAINS IN WHICH IMAGE EXISTS | WEIGHTING COEFFICIENT |
|---|---|---|
| 1 | MANUFACTURER AND DISTRIBUTOR OF ITEM | 0.0 |
| 2 | FLEA MARKET SITE | 0.75 |
|  | (SAME IMAGE DOES NOT EXIST IN ANY OF ABOVE DOMAINS) | 1.0 |

INFORMATION PROCESSING APPARATUS AND INFORMATION PROCESSING METHOD

CROSS-REFERENCE TO RELATED APPLICATION

The present application claims priority from Japanese application JP2020-181777 filed on Oct. 29, 2020, the content of which is hereby incorporated by reference into this application.

FIELD OF THE INVENTION

The present invention relates to an information processing apparatus and an information processing method.

BACKGROUND OF THE INVENTION

In the trading of an article for which a targeted object is specified such as a used item, it is important to grasp a state of the article in order to properly distribute the article. For example, an image and rank of the state of the item are published at an online flea market service and auction. A purchasing user estimates the state of the item from the rank. In order to make it easier to grasp the state of the article, a technique for automatically determining the state of the article has been developed.

JP 2019-91323 A discloses that a state of an item is determined based on an item image.

It may be difficult to automatically determine the state of the article for which the targeted object is specified from an item image registered for the explanation of the article. For example, when the image registered for the explanation of the used item contains an image of new article provided by a manufacturer, it becomes difficult to appropriately determine the state of the item from the image.

SUMMARY OF THE INVENTION

The present invention has been made in view of the problems described above, and an object thereof is to provide a technique capable of more accurately determining a state of an article for which a targeted object is specified from an image.

In order to solve the problems described above, an information processing apparatus according to one embodiment of the present invention includes an acquisition unit that acquires a plurality of images related to a specified article, a decision unit that decides suitability of each of the plurality of images for estimating a state of the article, and an output unit that outputs state information indicating an estimated state of the specified article based on a decision result of the decision unit and at least a part of the plurality of images.

An information processing method according to one embodiment of the present invention includes: acquiring a plurality of images related to a specified article, deciding suitability of each of the plurality of images for estimating a state of the article, and outputting state information indicating an estimated state of the specified article based on a result of the deciding and at least a part of the plurality of images.

In one embodiment of the present invention, the decision unit may decide a weight of each of the plurality of images, and the output unit may decide a state element value indicating the state of the specified article based on each of the plurality of images, generate state information indicating the state of the specified article based on the state element value and the weight decided for each of the plurality of images, and output the generated state information.

In one embodiment of the present invention, the decision unit may decide the weight so that a higher a probability that the image acquired by the acquisition unit is an image obtained by photographing the specified article, a greater the weight of the image.

In one embodiment of the present invention, the decision unit may include a learned model trained by training data indicating an image and the suitability of the image.

In one embodiment of the present invention, the decision unit may retrieve a same image as the acquired plurality of images, and decide the suitability based on whether or not the same image is found by the retrieval.

In one embodiment of the present invention, the decision unit may retrieve a same image as the acquired plurality of images, and decide the weight based on whether or not the same image is found by the retrieval.

In one embodiment of the present invention, the decision unit may decide the weight based on a providing source of the found image when the same image is found by the retrieval.

In one embodiment of the present invention, the decision unit may decide, as the suitability, a probability that the image acquired by the acquisition unit is an image obtained by photographing the specified article.

According to the present invention, the state of an article for which a targeted object is specified can be easily determined from an image.

DETAILED DESCRIPTION OF THE INVENTION

Hereinafter, embodiments of the present invention will be described with reference to the drawings. Duplicate description will be omitted for configurations with the same reference numerals. In this embodiment, an information processing system will be described. The information processing system allows a purchase candidate to browse registered information after information including an image for an article for which a targeted object is specified is registered by a user. The information processing system is, for example, a used item sales system that sells a used item as an article for which a targeted object is specified.

Figure 1:
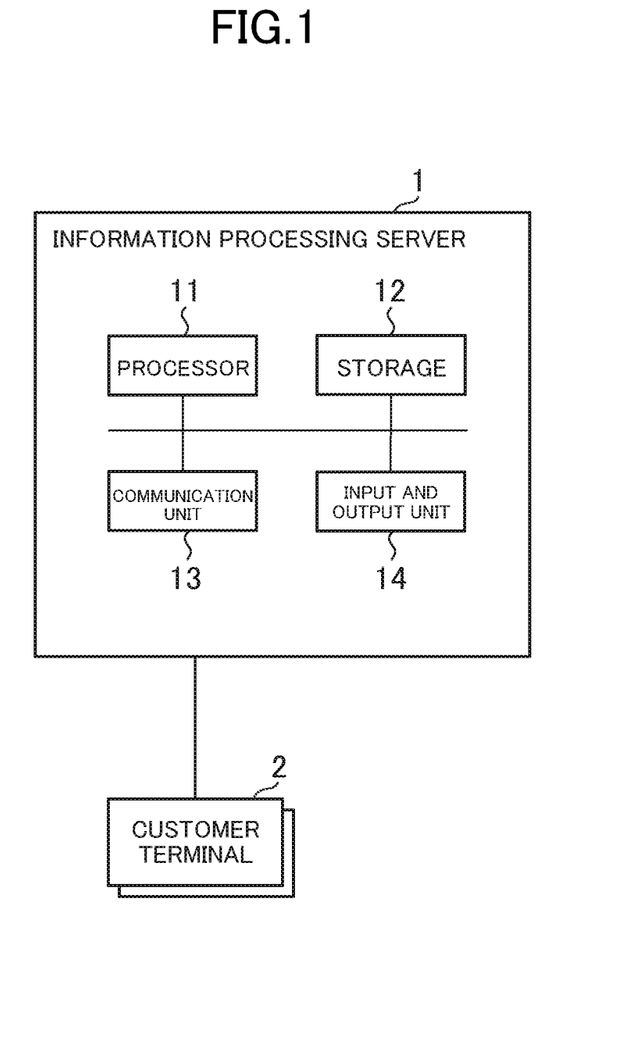
FIG. 1 is a diagram illustrating an example of an information processing system according to an embodiment of the present invention.

FIG. 1 is a diagram illustrating an example of an information processing system according to an embodiment of the present invention. The information processing system includes an information processing server 1 and at least one of customer terminals 2. The customer terminal 2 is, for example, a smartphone or a personal computer, and is operated by a user of a service provided by the information processing system.

The information processing server 1 communicates with the at least one of customer terminals 2, receives explanatory information related to an article for which a targeted object is specified and a plurality of images of the article from the customer terminal 2 operated by the user. The information processing server 1 registers the explanatory information and the images in the service. The information processing server 1 presents the explanatory information and the images related to the article to a user who is the purchase candidate. The article for which the targeted object is specified is, for example, a used item, and is a item that the purchaser specifies only one of a plurality of articles of the same type to purchase even if there are the plurality of articles of the same type. The article for which a targeted object is specified is also described as a "specified article". In the following, for the sake of brevity, unless otherwise specified, the term "article" refers to an article for which a targeted object is specified (specified article).

The information processing server 1 includes a processor 11, a storage 12, a communication unit 13, and an input and output unit 14. The information processing server 1 is a server computer. A processing of the information processing server 1 may be implemented by a plurality of server computers.

The processor 11 operates according to a program stored in the storage 12. The processor 11 controls the communication unit 13 and the input and output unit 14. The program described above may be provided via the Internet or the like, or may be provided by being stored in a computer-readable storage medium such as a flash memory or a DVD-ROM.

The storage 12 is configured with a memory device such as a RAM and a flash memory, and an external storing device such as a hard disk drive. The storage 12 stores the program. The storage 12 stores information and an operation result input from the processor 11, the communication unit 13, and the input and output unit 14. The storage 12 may store the received explanatory information and plurality of images. In order to store the received explanatory information and plurality of images, a storage different from the information processing server 1 may be provided.

The communication unit 13 implements a function of communicating with another device, and is configured with, for example, an integrated circuit that implements a wireless LAN or a wired LAN. Based on the control of the processor 11, the communication unit 13 inputs information received from another device to the processor 11 and the storage 12, and transmits the information to another device.

The input and output unit 14 is configured with a video controller that controls a display output device, a controller that acquires data from an input device, and the like. The input device includes a keyboard, mouse, touch panel, or the like. The input and output unit 14 outputs display data to the display output device based on the control of the processor 11, and acquires data input by the user operating the input device. The display output device is, for example, a display device connected to the outside.

Figure 2:
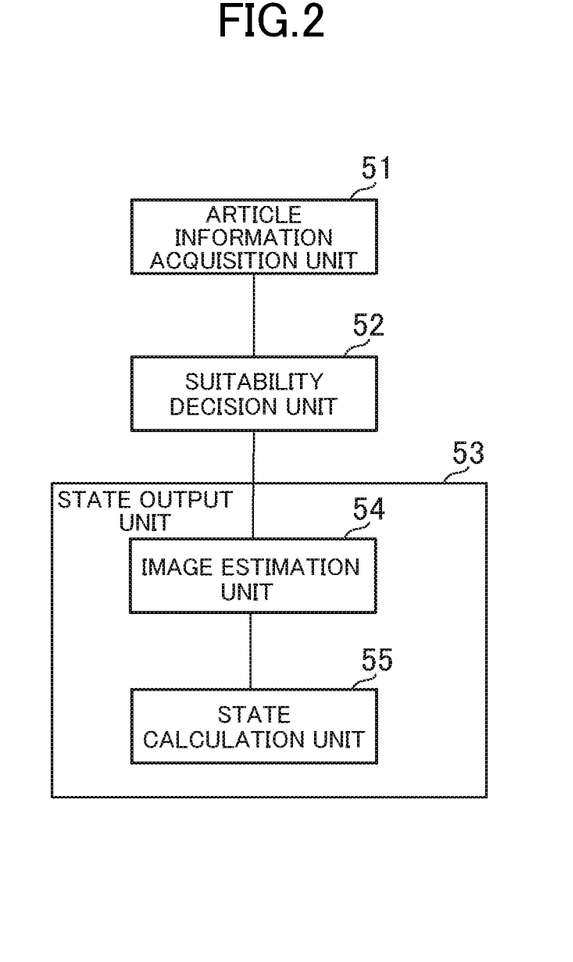
FIG. 2 is a block diagram illustrating functions implemented by the information processing system.

Next, functions provided by the information processing system will be described. FIG. 2 is a block diagram illustrating the functions implemented by the information processing system. The information processing system includes an article information acquisition unit 51, a suitability decision unit 52, and a state output unit 53. The state output unit 53 functionally includes an image estimation unit 54 and a state calculation unit 55. These functions are implemented by executing the program stored in the storage 12 and controlling the communication unit 13 and the like by the processor 11 included in the information processing server 1.

The article information acquisition unit 51 acquires a plurality of images and explanatory information related to the article from the customer terminal 2 operated by the user. The plurality of images may include an image obtained by photographing the article and an explanatory image that does not contain the article. The explanatory information includes information indicating a type of the article such as a manufacturer and a product name, and an explanatory note of the state of the article such as a purchase time and a scratch.

The suitability decision unit 52 decides suitability of each of the acquired plurality of images for estimating a state of the article. The state of the article is estimated by the image estimation unit 54 and the state calculation unit 55 included in the state output unit 53. Suitability also indicates how accurately a state of an article can be estimated from an image.

The decision of suitability may be a determination as to whether or not the image is used in a process of obtaining an element value of the state performed by the image estimation unit 54 or may be a calculation of a weighting coefficient indicating reliability of a value estimated from the image. The weighting coefficient is a value indicating the degree of importance of the image in estimating the state of the article from the element values obtained for each image performed by the state calculation unit 55.

The state output unit 53 outputs state information indicating the estimated state of the article based on the decision result of the suitability decision unit 52 and at least a part of the acquired plurality of images.

The image estimation unit 54 included in the state output unit 53 calculates, for each of at least a part of the plurality of images, an element value which is estimated on the state of the article.

The state calculation unit 55 included in the state output unit 53 estimates the estimated state of the article based on the element values calculated for each of the plurality of images and the suitability, and outputs the state information indicating the estimated state.

Figure 3:
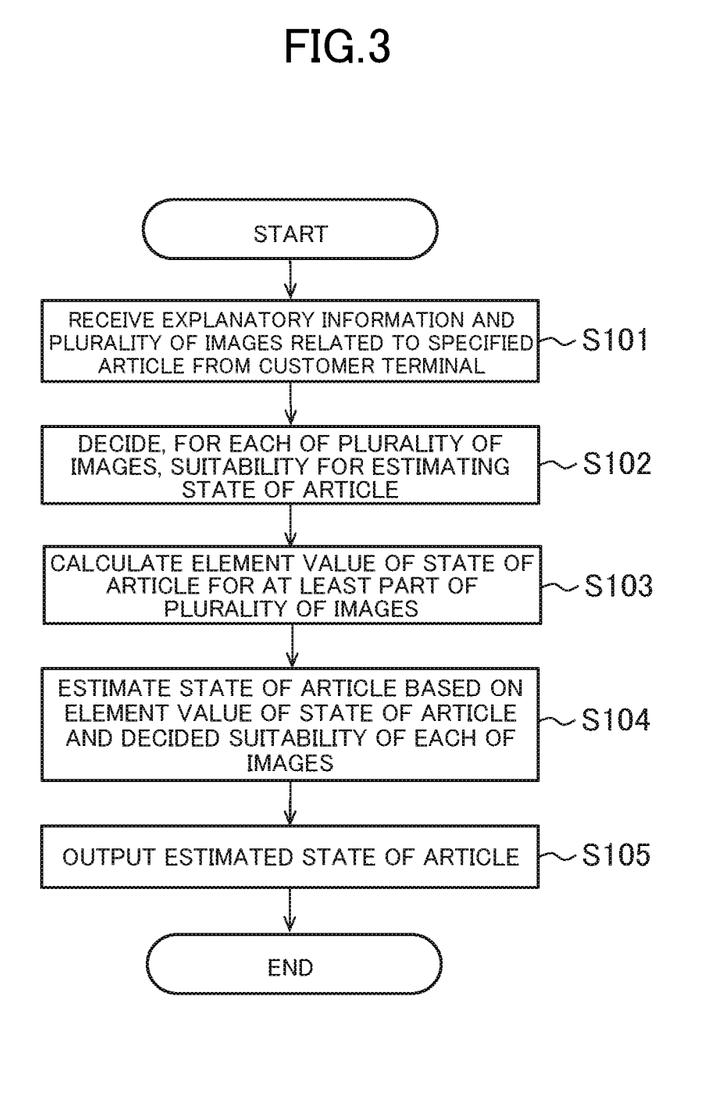
FIG. 3 is a flow chart illustrating an example of a process by an information processing server.

FIG. 3 is a flow chart illustrating an example of a process by the information processing server 1. First, although not illustrated, the customer terminal 2 outputs a screen for registering the article to be sold, and transmits explanatory information input by the user on the screen and the plurality of registered images to the information processing server 1.

The article information acquisition unit 51 receives explanatory information and a plurality of images related to a specified article from the customer terminal 2 (step S101).

Figure 4:
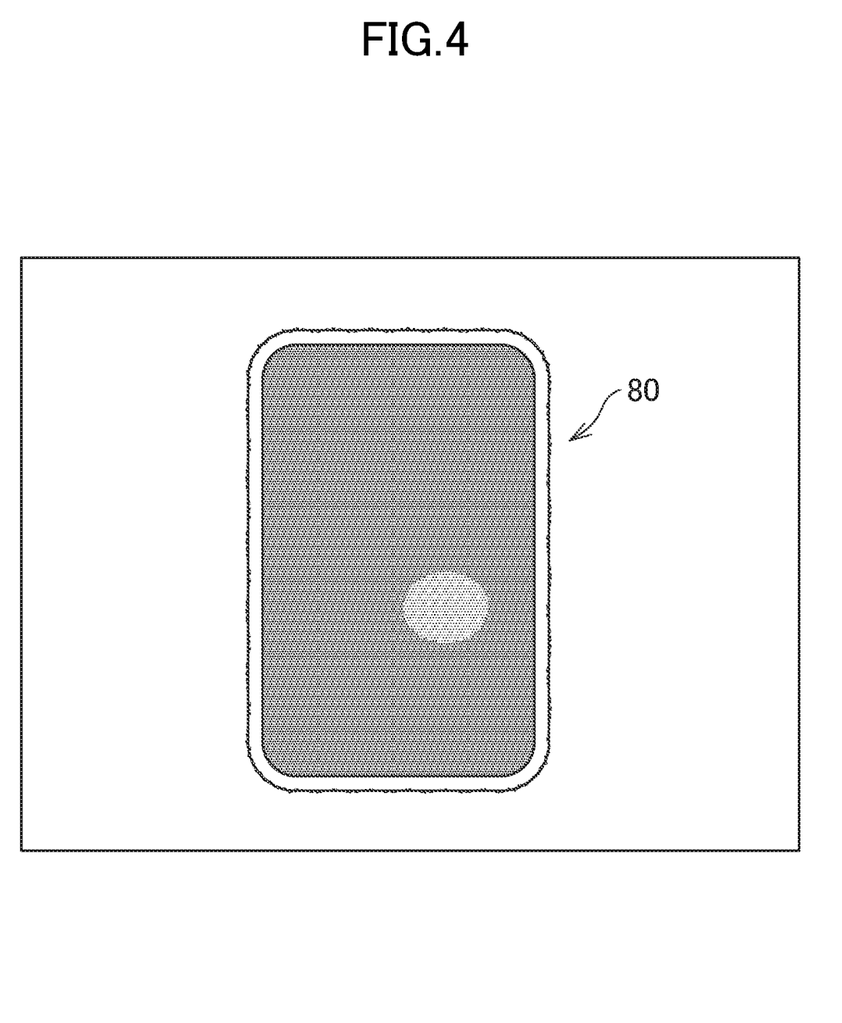
FIG. 4 is a diagram illustrating an example of an input image.

FIG. 4 is a diagram illustrating an example of an input image. In the example of FIG. 4, an image of a smartphone 80, which is an article photographed by the user, is illustrated as an image related to the article. Unlike an image for product advertisement, in an image photographed by the user, a phenomenon in which edges become unclear often occurs and reflection of ambient light is often occurring.

When a plurality of images are received, the suitability decision unit 52 decides suitability of each of the plurality of images for estimating a state of the article (step S102). When the suitability is decided, the image estimation unit 54 included in the state output unit 53 calculates the element value of the state of the article for each of at least a part of the plurality of images (step S103). Here, when the suitability decision unit 52 determines whether or not each of the plurality of images is used for a process of the image estimation unit 54, the image estimation unit 54 may calculate the element value for each of the images determined to be used for the process. When the suitability decision unit 52 calculates the weighting coefficient of each of the plurality of images, the image estimation unit 54 may calculate the element value for all the images, or may calculate the element value for the image whose weighting coefficient is not 0.

The element value may be calculated by a machine learning model. More specifically, the image estimation unit 54 inputs each of the plurality of images into the machine learning model, and acquires an output of the machine learning model as the element value estimated from the image.

The machine learning model is trained in advance by learning data including a learning input image and a determination result of a state of an article. The learning data includes a learning input image in which an image is enlarged or reduced so as to have a predetermined number of pixels, and given output data indicating an element value of the image. The learning data may be a plurality of sets, each of which contains an image and an element value of the state of the article given in advance to the image, or may be a plurality of sets, each of which contains an image of an article extracted from the flea market service and a rank (treated as an element value) given to the article.

In this embodiment, the machine learning model may be a machine learning model in which machine learning such as AdaBoost, Random Forest, Neural Network, Support Vector Machine (SVM), and Nearest Discriminator is implemented. More specifically, a machine learning model using so-called deep learning may be constructed as the machine learning model, and even in deep learning, a machine learning model that learns the estimation of the element value while automatically learning an area of interest at the time of determination, such as Attention Branch Network, may be used.

The element value may be calculated without directly handling the image in the machine learning model. For example, frequency of each of a plurality of Visual Words extracted from an image may be acquired by the method of Bag of Visual Words (BoVW), and an element value may be calculated by a predetermined function based on the frequency. The image estimation unit 54 may determine the feature using the machine learning model trained by the training data including a distribution of the frequency and the state of the article.

When the element value is calculated, the state calculation unit 55 estimates the state of the article based on the element value of the state of the article and the decided suitability of each of at least a part of the image (step S104). When it is determined, as the suitability, whether or not each of the plurality of images is used for the process of the image estimation unit 54, an average of the estimated element values maybe acquired as a value of the state of the article.

When the weighting coefficient is calculated as the suitability, a weighted average of the element values is acquired as the state of the article. More specifically, the state calculation unit 55 calculates the sum of the weighting coefficients each of which is calculated for each of the plurality of images. The state calculation unit 55 calculates a product of the element value and the weighting coefficient for each of the images, and acquires the sum of the products. The state calculation unit 55 acquires a value obtained by dividing the sum of the products by the sum of weight coefficients as a value indicating the state of the article.

The state calculation unit 55 may acquire a rank as the state of the article, rather than the calculated value of the state of the article itself. In this case, the state calculation unit 55 correlates the rank with a range of the value in advance, and acquires the rank corresponding to the range to which the calculated value of the state of the article belongs as the state of the article, that is, state information.

When the state of the article is estimated, the state calculation unit 55 outputs the estimated state of the article (step S105). The state calculation unit 55 may output, as the state of the article, information for causing the information indicating the estimated state of the article to be displayed on the customer terminal 2. In this case, the customer terminal 2 may transmit, to the information processing server 1, information indicating the rank of the article input by the user with reference to the output information, and the state calculation unit 55 may store the transmitted information in the storage 12 in association with the article. The state calculation unit 55 may output the state of the article to the storage 12 without the user's operation and store the state of the article in association with the article registered by the user.

In this embodiment, the image estimation unit 54 (step S103) estimates, for each of the images, the element value of the state of the article, and the state calculation unit 55 (particularly step S104) estimates the state of the article itself from the element value. Here, if a plurality of images registered by the user contain an image of a product created by the manufacturer or an image mainly composed of an explanatory note thereof, there is a concern that the element values of the state estimated from those images are not correct. The suitability decision unit 52 evaluates the height of probability that an appropriate element value is calculated from the image and reflects the element value in the subsequent processes, thereby making it possible to estimate the state of the article more accurately.

Figure 5:
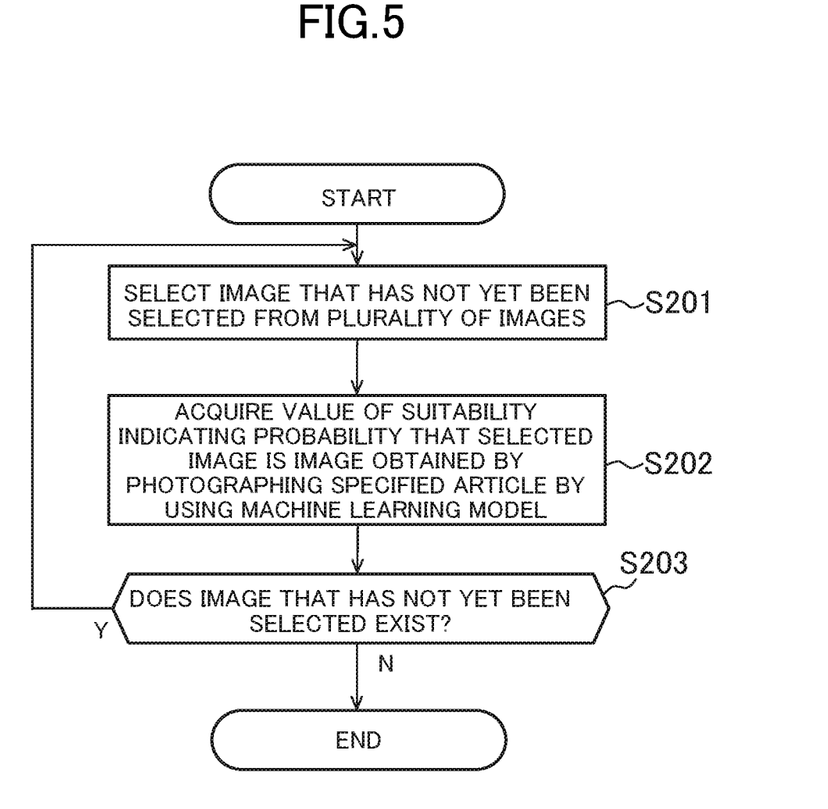
FIG. 5 is a flow chart illustrating an example of a process of a suitability decision unit.

Details of a process of step S102 will be further described. FIG. 5 is a flow chart illustrating an example of a process of the suitability decision unit 52. FIG. 5 illustrates an example of deciding suitability using the machine learning model.

The suitability decision unit 52 first selects an image that has not yet been selected from the acquired plurality of images (step S201). Next, the suitability decision unit 52 uses the machine learning model to acquire a value of suitability indicating the height of probability that the selected image is an image obtained by photographing a specified article (step S202).

More specifically, the suitability decision unit 52 inputs the selected image into the machine learning model, and acquires the output of the machine learning model as suitability. In this embodiment, the machine learning model is a machine learning model in which machine learning such as AdaBoost, Random Forest, Neural Network, Support Vector Machine (SVM), and Nearest Neighbor Discriminator is implemented.

The machine learning model is trained in advance by training data including a learning input image and an output value. The learning data includes a learning input image in which an image is enlarged or reduced so as to have a predetermined number of pixels, and a given output value (for example, a value of weighting coefficient) indicating suitability of the image.

When the suitability is acquired, the suitability decision unit 52 repeats a process from step S201 and subsequent steps if an image that has not yet been selected exists (Y in step S203). On the other hand, when all the images are selected (N in step S203), the process of the suitability decision unit 52 ends.

In step S202, the suitability may be decided without inputting an image into the machine learning model. For example, the suitability decision unit 52 may decide suitability by generating a histogram of appearance frequency of Visual Word from an image using the method of Bag of Visual Words (BoVW) and determining the feature of the histogram. The suitability decision unit 52 may determine the feature using the machine learning model trained by the training data including the histogram and a value of suitability and may calculate the value of suitability from the histogram based on a predetermined calculation algorithm.

Figure 6:
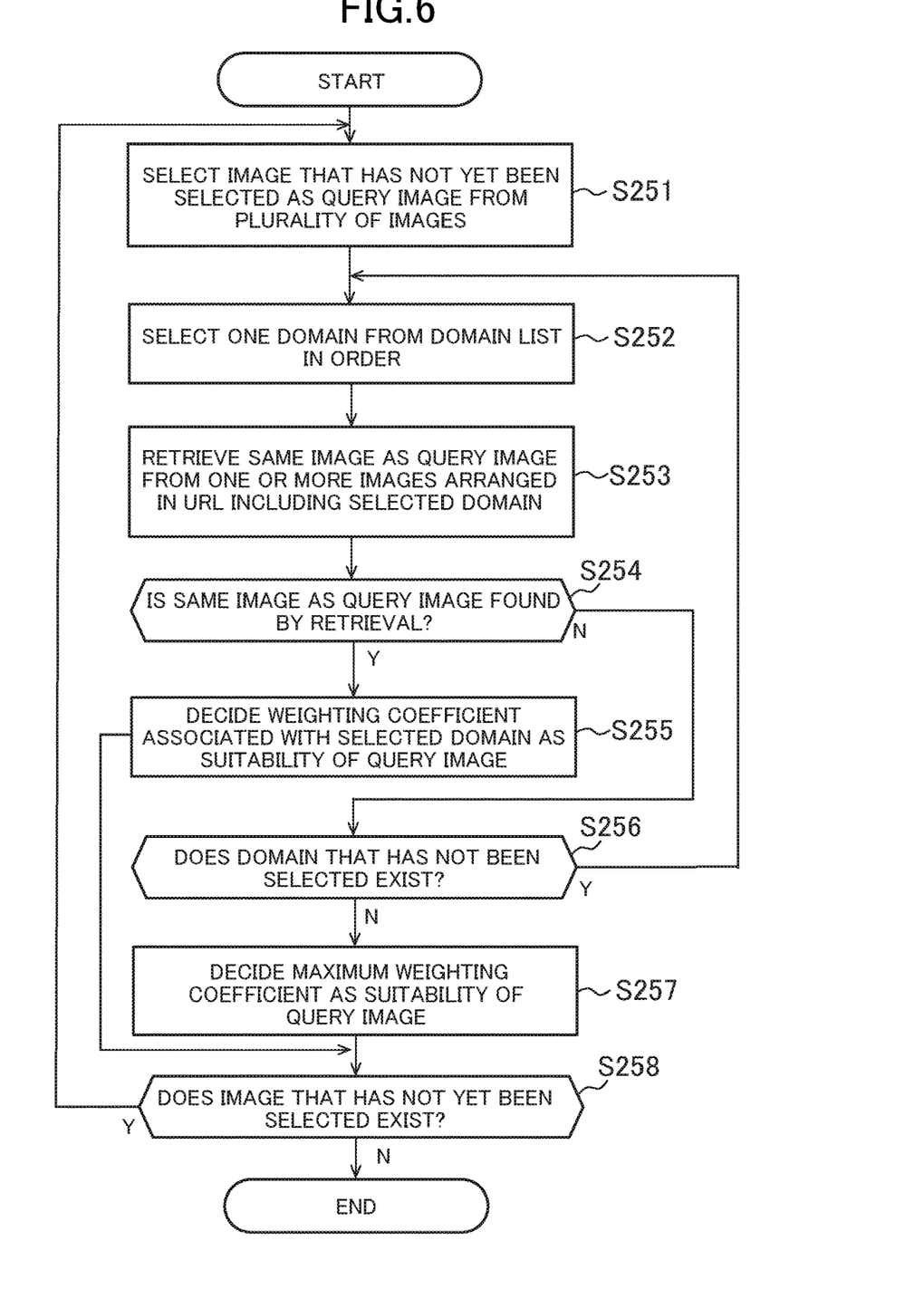
FIG. 6 is a flow chart illustrating another example of the process of the suitability decision unit.

The suitability for a certain image may be decided, for example, by detecting whether or not the same image as the image exists on another site. FIG. 6 is a flow chart illustrating another example of the process of the suitability decision unit 52.

In the example of FIG. 6, first, the suitability decision unit 52 selects an image that has not yet been selected as a query image from the plurality of images (step S251), and resets information indicating a currently selected domain in a domain list. The suitability decision unit 52 selects one domain from the domain list in order (step S252). The domain list is a list of domains for each of which an image is to be retrieved. The domains included in the domain list may be grouped. A plurality of images are arranged in the domain, and the images arranged in the selected domain are images for search. The domain is information that specifies the providing source of an image.

Figure 7:
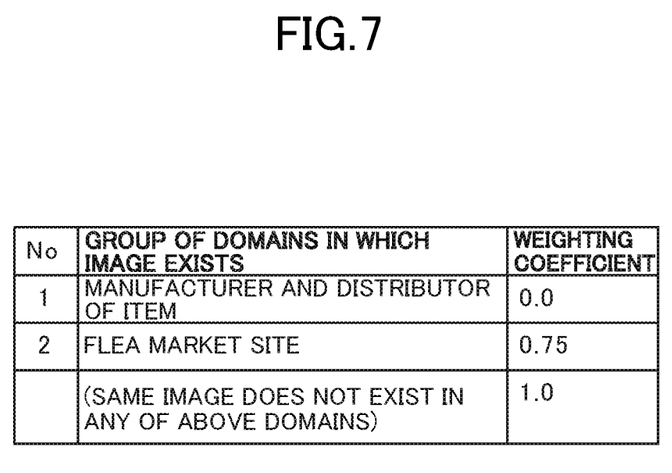
FIG. 7 is a diagram illustrating an example of a relationship between a domain and a weighting coefficient.

FIG. 7 is a diagram illustrating an example of the relationship between the domain and the weighting coefficient. The table illustrated in FIG. 7 illustrates the relationship between a group of domains and the weighting coefficient. The weighting coefficient is decided as suitability when the same image as the query image exists in the domain belonging to the group. In the example in FIG. 7, the first group contains domains of the manufacturer and distributor of the item, and the second group contains a domain of the flea market or auction site that distributes the used article.

For example, it is highly probable that an advertising image of an unused item is arranged within the domains of the manufacturer and distributor of the item. For that reason, the weighting coefficient associated with this domain group is 0. On the other hand, when the same image does not exist in any domain, it is highly probable that the image was photographed independently. Therefore, the weighting coefficient in this case is set to 1, which is the maximum value. In the example of FIG. 7, there is also an intermediate value between 0 and 1 as the value of the weighting coefficient. For example, in a domain included in a group of flea market or auction site, the weight coefficient value is set to an intermediate value in consideration of the possibility that the same article may be listed in duplicate. The domain list may include domains of other sales sites.

When a domain is selected, the suitability decision unit 52 retrieves the same image as the query image from one or more images arranged in the URL including the selected domain (step S253). The suitability decision unit 52 may retrieve the same image as the query image from the images arranged in the domain by using a known image search technique on the Internet such as that used for GOOGLE image retrieval. In image retrieval, a similar image having a higher similarity than a threshold value, among the similar images, may be regarded as the same image and the retrieval may be performed.

When the same image as the query image is found by the retrieval (Y in step S254), the suitability decision unit 52 decides the weighting coefficient associated with the selected domain to be retrieved as the suitability of the query image (step S255).

On the other hand, in step S254, when the same image as the query image is not found by the retrieval (N in step S254), the suitability decision unit 52 determines whether a domain that has not been selected exists (step S256). When a domain that has not been selected exists (Y in step S256), the process of step S252 and subsequent steps is repeated for the remaining domains. When all domains are selected (N in step S256), the suitability decision unit 52 decides the maximum weighting coefficient (1.0 in the example of FIG. 7) as the suitability of the currently selected query image (step S257).

After step S255 or step S257 is executed, the suitability decision unit 52 determines whether or not an image that has not yet been selected as the query image exists (step S258). When the image that has not yet been selected as the query image exists (Y in step S258), the suitability decision unit 52 repeats the process from step S251 and subsequent steps, and when all the images are selected as query images (N in step S258), the suitability decision unit 52 ends the process.

The list of domains is arranged so that the domain belonging to the group with the higher weighting coefficient is ordered earlier. When the same image exists in a plurality of domains associated with different weighting coefficients, the lowest weighting coefficient is decided as the suitability of the query image.

In the example of FIG. 6, the weighting coefficient is set according to whether or not the same image as the image registered by the user can be found in the predetermined domain, and according to the domain in which the image is found. Alternatively, the suitability decision unit 52 may set the weighting coefficient based on the number of the same images found. For example, when the number of images found exceeds a first threshold value, the weighting coefficient may be set to 1, and when the number of images found is less than or equal to the first threshold value, the weighting coefficient may be calculated by a predetermined function that monotonically increases from 0 to 1 according to the number of images found.

As described above, when determining the state of the article for which the targeted object is specified, such as the used item, from an image, the suitability for using the image to estimate the state of the article is decided, and the state of the article is estimated from the suitability of each image and the element value of the state of the article extracted from the image. With this configuration, even when the plurality of images registered by the user and related to the article do not include the image of the article, the state of the article can be estimated more accurately. It is also possible to more accurately estimate a price of article (for example, reasonable price, recommended price, easy-to-purchase price) from the estimated state, and it becomes possible to assist a task of setting an amount of money by the user in the flea market service and auction service.

By making the automatically calculated state of the article more accurate, in the flea market service and the auction service where the user sells the used article on customer-to-customer basis, it is possible to reduce fluctuation of the evaluation of the state of the article, which is caused by the non-expert user inputting the state of the article.

The techniques described so far are particularly effective in the flea market service and the auction service, but can be applied to any service in which a user registers a plurality of images related to an article. For example, this technique may be applied to a used item purchase service. In this case, even when the registered image includes an image of a box on which the item is printed, it is possible to accurately predict the state of the article. By presenting a provisional purchase price to the user with the price predicted from the estimated state, it is possible to support the user's judgement to sell and reduce the burden on a business operator who determines the state of the item.

While there have been described what are at present considered to be certain embodiments of the invention, it will be understood that various modifications maybe made thereto, and it is intended that the appended claims cover all such modifications as fall within the true spirit and scope of the invention.

What is claimed is:

1. An information processing apparatus comprising:
    at least one processor; and
    at least one memory device that stores a plurality of instructions which, when executed by the at least one processor, causes the at least one processor to:
    acquire a plurality of images related to a specified article wherein at least one of the plurality of images in which the specific article is photographed is photographed by a user;
    input the plurality of images into a first trained machine learning model to acquire a suitability value indicating a probability that each of the plurality of images is an image obtained by photographing the specified article;
    decide a suitability for estimating a condition of the specified article in the image based on the output from the first trained machine learning model for each of the plurality of images;
    input the plurality of images into a second trained machine learning model;
    acquire as an output of a second trained machine learning model, an element value of the condition of the specified article for each of the plurality of images; and
    output condition information of the specified article indicating an estimated condition of the specified article based on the suitability and the element value.

2. The information processing apparatus according to claim 1, wherein the plurality of instructions cause the at least one processor to:
    decide, in the suitability decision, a weight of each of the plurality of images;
    decide a condition element value indicating the condition of the specified article based on each of the plurality of images;
    generate condition information indicating the condition of the specified article based on the condition element value and the weight decided for each of the plurality of images, and
    output the generated condition information.

3. The information processing apparatus according to claim 2, wherein the plurality of instructions cause the at least one processor to:
    decide the weight so that a higher a probability that the acquired image is a unique image obtained by photographing the specified article, a greater the weight of the image.

4. The information processing apparatus according to claim 1, wherein the plurality of instructions cause the at least one processor to:
    decide the suitability by the first trained machine learning model trained by training data indicating an image and the suitability of the image.

5. The information processing apparatus according to claim 2, wherein the plurality of instructions cause the at least one processor to:
    retrieve a same image as the acquired plurality of images, and
    decide the weight based on whether or not the same image is found by the retrieval.

6. The information processing apparatus according to claim 5, wherein the plurality of instructions cause the at least one processor to:
    decide the weight based on a providing source of the found image when the same image is found by the retrieval.

7. The information processing apparatus according to claim 1, wherein the plurality of instructions cause the at least one processor to:
    decide, as the suitability of an image, a probability that the acquired image is unique and was obtained by photographing the specified article.

8. An information processing method comprising:
    acquiring, with at least one processor operating with a memory device in a system, a plurality of images related to a specified article wherein at least one of the plurality of images in which the specific article is photographed is photographed by a user,
    inputting the plurality of images into a first trained machine learning model to acquire a suitability value indicating a probability that each of the plurality of images is an image obtained by photographing the specified article;
    deciding, with the at least one processor operating with the memory device in the system, a suitability for estimating a condition of the specified article in the image based on the output from the first trained machine learning model for each of the plurality of images;
    inputting the plurality of images into a second trained machine learning model;
    acquiring as an output of a second trained machine learning model, an element value of the condition of the specified article for each of the plurality of images; and
    outputting, with the at least one processor operating with the memory device in the system, condition information of the specified article indicating an estimated condition of the specified article based on a result of the deciding and at least a part of the plurality of images.

9. The information processing apparatus according to claim 2, wherein the plurality of instructions cause the at least one processor to only input the images with a non-zero weight among the plurality of images into the second trained machine learning model.

* * * * *